United States Patent
Yanni

(10) Patent No.: US 8,459,094 B2
(45) Date of Patent: Jun. 11, 2013

(54) METHOD FOR CALIBRATING AN ACCELEROMETER OF AN ELECTRONIC DEVICE, AN ACCELEROMETER, AND AN ELECTRONIC DEVICE HAVING AN ACCELEROMETER WITH IMPROVED CALIBRATION FEATURES

(75) Inventor: Mamdouh Kamal Yanni, Waterloo (CA)

(73) Assignee: Research In Motion Limited, Waterloo (CA)

( * ) Notice: Subject to any disclaimer, the term of this patent is extended or adjusted under 35 U.S.C. 154(b) by 480 days.

(21) Appl. No.: 12/362,525

(22) Filed: Jan. 30, 2009

(65) Prior Publication Data
US 2010/0192662 A1  Aug. 5, 2010

(51) Int. Cl.
*G01P 21/00* (2006.01)
(52) U.S. Cl.
USPC .......................... 73/1.38; 73/488; 73/504.02
(58) Field of Classification Search
USPC ....................... 73/1.38, 488, 504.02
See application file for complete search history.

(56) References Cited

U.S. PATENT DOCUMENTS

| | | | | |
|---|---|---|---|---|
| 5,645,077 A * | 7/1997 | Foxlin | ............... | 600/587 |
| 5,807,284 A * | 9/1998 | Foxlin | ............... | 600/595 |
| 6,361,507 B1 * | 3/2002 | Foxlin | ............... | 600/595 |
| 6,640,609 B1 * | 11/2003 | Nadkarni et al. | ............... | 73/1.37 |
| 6,738,721 B1 * | 5/2004 | Drucke et al. | ............... | 702/95 |
| 6,786,877 B2 * | 9/2004 | Foxlin | ............... | 600/587 |
| 7,350,394 B1 | 4/2008 | Flynn et al. | | |
| 7,461,535 B2 * | 12/2008 | Huang et al. | ............... | 73/1.01 |
| 7,526,402 B2 * | 4/2009 | Tanenhaus et al. | ............... | 702/151 |
| 2003/0061859 A1 | 4/2003 | Rothoff | | |

FOREIGN PATENT DOCUMENTS

| | | |
|---|---|---|
| EP | 0999449 | 5/2000 |
| JP | 06331647 | 12/1994 |
| WO | WO 93/14409 | 7/1993 |
| WO | 2004041086 | 5/2004 |

OTHER PUBLICATIONS

KIONIX—Precision in Motion—"Handheld Electronic Compass Applications Using the Kionix KXM52 MEMS Tri-Axis Accelerometer"; Oct. 1, 2004.
KIONIX—"Accelerometer Errors"; May 3, 2007.
Award Winning iSensor Technology; "Highly Integrated and Programmable Motion Sensor Processing for Industrial Application"; http://www.analog.com/en/content/0,2886,764%255F800%255F99352%255F0,00.html; At least as early as Mar. 19, 2008.

(Continued)

*Primary Examiner* — Hezron E Williams
*Assistant Examiner* — Rodney T Frank
(74) *Attorney, Agent, or Firm* — Ridout & Maybee LLP

(57) ABSTRACT

An accelerometer with improved calibration features, an electronic device having an accelerometer with improved calibration features, and a method of calibrating an accelerometer of an electronic device are provided. In accordance with one embodiment, there is method of calibrating an accelerometer of an electronic device, the accelerometer having at least a primary sensing axis and a secondary sensing axis, the second sensing axis being oriented parallel to the primary sensing axis and in the opposite direction of the primary sensing axis, the method comprising: measuring acceleration calibration data using the primary sensing axis and the secondary sensing axis of the accelerometer; determining calibration parameters in accordance with measured calibration data from the accelerometer; and storing the calibration parameters in a memory of the electronic device.

20 Claims, 9 Drawing Sheets

OTHER PUBLICATIONS

Analog Devices—"Hi Precison Tri-Axis Inertial Sensor—ADIS16350/ADIS16355"; At least as early as Mar. 19, 2008.

"Tilt Sensing Using Linear Accelerometers"; Freescale Semiconductor, Inc.; Jun. 2007.

Randy Carver and Mark Looney; "MEMES accelerometer calibration optimizes accuracy for industrial applications"; Oct. 27, 2007.

Communication Pursuant to Article 94(3) EPC; EP Application No. 09151748.2; Dated Aug. 16, 2012.

* cited by examiner

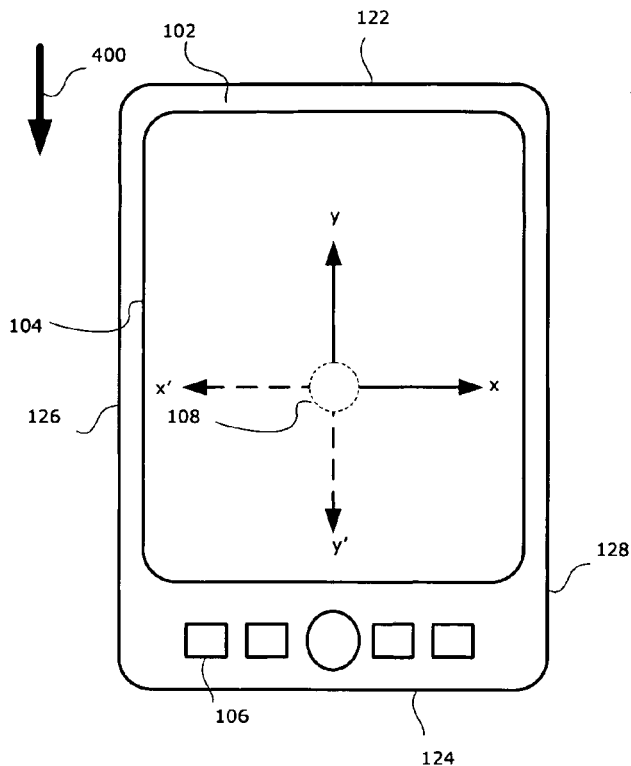
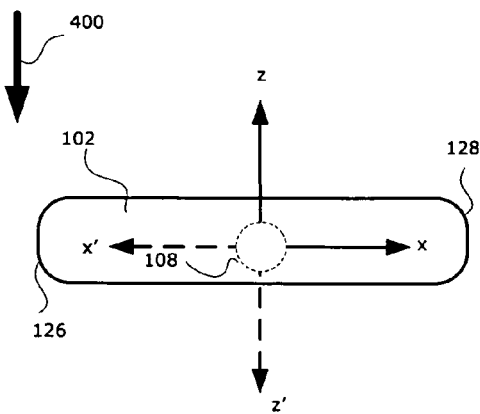
FIG. 4A
FIG. 4B
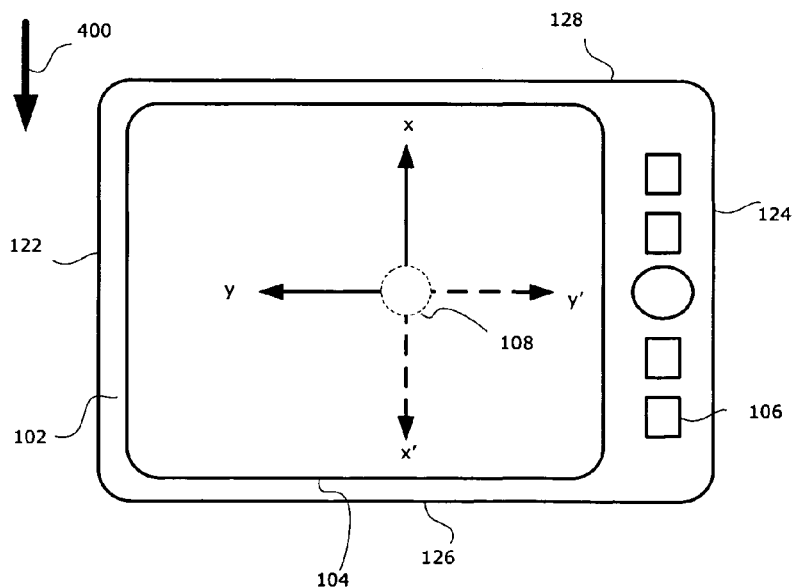
FIG. 4C

METHOD FOR CALIBRATING AN ACCELEROMETER OF AN ELECTRONIC DEVICE, AN ACCELEROMETER, AND AN ELECTRONIC DEVICE HAVING AN ACCELEROMETER WITH IMPROVED CALIBRATION FEATURES

TECHNICAL FIELD

The present disclosure relates generally to accelerometers, and in particular, to a method of calibrating an accelerometer of an electronic device, an accelerometer, and an electronic device having an accelerometer with improved calibration features.

BACKGROUND

Accelerometers are sometimes incorporated into electronic devices such as handheld electronic devices to provide a variety of functions including, but not limited to, determining the position (e.g. tilt or orientation) of the device and detecting a tap on a touchscreen device. Assembling accelerometers into electronic devices typically requires accelerometer calibration issues to be addressed. Although calibration of accelerometers has largely been a factory test problem following their manufacture, the assembly of accelerometers into electronic devices may result in accelerometers that are rotated or tilted relative to the desired position. That is, the accelerometer may suffer from non-zero pitch and roll effects. Furthermore, after a power cycle in which the electronic device is turned off and then on, some of the operating characteristics of the accelerometer may change. Accordingly, in at least some instances it may be desirable to calibrate or recalibrate the accelerometer after the accelerometer is assembled into the electronic device.

The use of accelerometers for inertial navigation systems (INS) and other high resolution/high accuracy applications (such as, for example, motion detection systems in wireless game controllers) requires more precise calibration of accelerometers. Automated calibration systems may be expensive and the time required to calibrate the accelerometer (either manually or automatically) adds to the total cost of production of the electronic device. This is a particular concern in the context of high-volume manufacturing of electronic devices having a built-in accelerometer.

Thus, there remains a need for improved methods of calibrating an accelerometer.

BRIEF DESCRIPTION OF THE DRAWINGS

FIG. 4A is a front plan view of an example electronic device having an accelerometer illustrating the electronic device placed in a first orientation;

FIG. 4B is a side view of an example electronic device having an accelerometer illustrating the electronic device placed in a second orientation;

FIG. 4C is a front view of an example electronic device having an accelerometer illustrating the electronic device placed in a third orientation;

Like reference numerals are used in the drawings to denote like elements and features.

DETAILED DESCRIPTION OF EXAMPLE EMBODIMENTS

Figure 1:
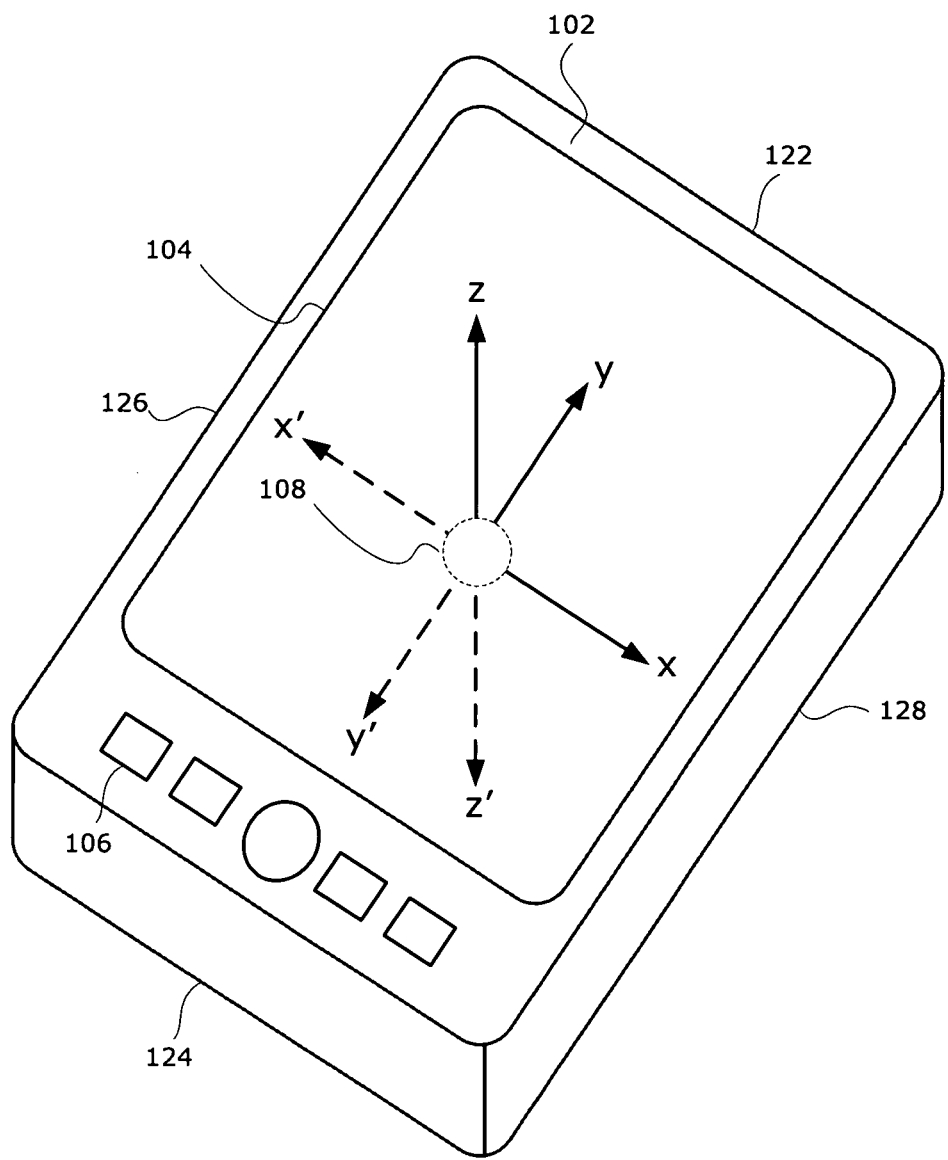
FIG. 1 is a front view of an electronic device having a six-axis accelerometer in accordance with one example embodiment of the present disclosure.

The present disclosure provides an accelerometer with improved calibration features, an electronic device having an accelerometer with improved calibration features, and a method of calibrating an accelerometer of an electronic device. The accelerometer comprises a sensing element having one or more pairs of opposed sensing components which can be used to more easily calculate calibration parameters for the accelerometer. Each pair of sensing components comprises a primary component and a secondary sensing component. One of the sensing components in each pair of sensing components, typically the second sensing component, is used for calibrating the other sensing component of the pair of sensing components. A temperature sensor may be used in combination with the accelerometer, either as part of an integrated circuit in which the accelerometer is provided or as part of the electronic device which hosts the accelerometer, to at least partially compensate for the temperature sensitivity of the accelerometer. The accelerometer may be a ratiometric accelerometer, or a low drop out regulator may be used to provide power to the accelerometer to at least partially compensate for ratiometric errors if the accelerometer is not a ratiometric accelerometer.

In accordance with one aspect of the present disclosure, there is provided a method of calibrating an accelerometer of an electronic device, the accelerometer comprising a sensing element, wherein the sensing element includes a primary sensing component and a secondary sensing component which each measure acceleration along a first sensing axis, wherein the primary sensing component has a positive heading which measures positive acceleration in a first direction relative to the first sensing axis and the secondary sensing component has a positive heading which measures positive acceleration in a second direction oriented 180° relative to the first direction of the primary sensing component, the method comprising: measuring first acceleration using the primary sensing component to obtain first calibration data; measuring second acceleration using the secondary sensing component to obtain second acceleration calibration data; determining calibration parameters in accordance with the first acceleration calibration data and the second acceleration calibration data, the calibration parameters representing values for adjusting an acceleration measured using the accelerometer; and storing the calibration parameters in a memory of the electronic device.

In some embodiments, the calibration parameters comprise a bias factor of the primary sensing axis, the determining comprising: determining the bias factor for the first sensing axis using the first acceleration calibration data and the second acceleration calibration data.

In some embodiments, wherein the bias factor is determined using the formula:

$$B = \frac{A + A'}{2}$$

where B is the bias factor, A is the first acceleration calibration data and A' is the second acceleration calibration data.

In some embodiments, the bias factor is determined as an average of the first acceleration calibration data and the second acceleration calibration data when the electronic device is in a first orientation.

In some embodiments, the bias factor is determined as an average of the first acceleration calibration data and the second acceleration calibration data when the electronic device is in a first and second orientation.

In some embodiments, the calibration parameters comprise a sensitivity of the first sensing axis, the method comprising aligning the first sensing axis with a force of gravity, and determining the sensitivity of the first sensing axis using the first acceleration calibration data and the second acceleration calibration data.

In some embodiments, the sensitivity is determined using the formula:

$$S = \frac{A' - A}{2}$$

where S is the sensitivity, A' is the first acceleration calibration data when the first sensing axis is aligned with the force of gravity, and A is the second acceleration calibration data when the first sensing axis is aligned with the force of gravity.

In some embodiments, the calibration parameters comprise a sensitivity of the first sensing axis, the method comprising determining the sensitivity of the first sensing axis using the first acceleration calibration data and the second acceleration calibration data using the formula:

$$S = \frac{A' - A}{2}$$

where S is the sensitivity, A' is the first acceleration calibration data when the first sensing axis is not aligned with the force of gravity, and A is the second acceleration calibration data when the first sensing axis is not aligned with the force of gravity; and transposing the sensitivity from a coordinate system in which the first sensing axis is not aligned with the force of gravity to a second coordinate system wherein the first sensing axis is aligned with the force of gravity.

In some embodiments, the method further comprises measuring further acceleration to obtain measurement data using the accelerometer, and adjusting the measurement data in accordance with the calibration parameters stored in the memory.

In some embodiments, the method further comprises: measuring a temperature of the accelerometer; determining a temperature correction factor for the accelerometer measurements in accordance with the measured temperature; and adjusting the measured acceleration in accordance with the calibration parameters stored in the memory and the temperature correction factor.

In some embodiments, the sensing element has three pairs of sensing axes, each of the three pairs of sensing axes being mutually orthogonal to each other, wherein the sensing element includes a primary sensing component and a secondary sensing component for each sensing axis which each measure acceleration along a respective sensing axis, wherein the primary sensing component for each sensing axis has a positive heading which measures positive acceleration in a first direction relative to the respective sensing axis and the secondary sensing component for each sensing axis has a positive heading which measures positive acceleration in a second direction oriented 180° relative to the first direction of the primary sensing component for respective sensing axis. The calibration procedures are performed for each pair of sensing axes. Namely, the method comprises measuring first acceleration using the primary sensing component for each sensing axis to obtain first calibration data; measuring second acceleration using the secondary sensing component for each sensing axis to obtain second acceleration calibration data; determining calibration parameters for each sensing axis in accordance with the first acceleration calibration data and the second acceleration calibration data, the calibration parameters representing values for adjusting an acceleration measured using the accelerometer; and storing the calibration parameters in the memory of the electronic device.

Any of the above-described embodiments may further comprise: determining when the accelerometer is stationary; and calibrating the accelerometer when the accelerometer is stationary. The determining when the accelerometer may stationary comprise: obtaining a plurality of accelerometer measurements from at least one of the primary sensing axis or secondary sensing axis over a predetermined period of time; and determining whether the plurality of accelerometer measurements are within a predetermined variance threshold. Alternatively, rather than calibrating the accelerometer when the accelerometer is stationary, in other embodiments the method may comprise, prior to determining, filtering the accelerometer measurements to remove a dynamic component caused by movement of the accelerometer.

Any of the above-described embodiments may further comprise: detecting a change in power status of an electronic device; and determining a bias factor is performed if it is determined that the power status of the electronic device has changed to a state in which the electronic device is powered on.

Any of the above-described embodiments may further comprise: displaying a prompt on a display screen of the electronic device, the prompt including an instruction to orient the electronic device in a predetermined orientation in which the primary sensing axis is aligned with a force of gravity.

In accordance with another aspect of the present disclosure, there is provided an accelerometer, comprising a sensing element, wherein the sensing element includes a primary sensing component and a secondary sensing component which each measure acceleration along a first sensing axis, wherein the primary sensing component has a positive heading which measures positive acceleration in a first direction relative to the first sensing axis and the secondary sensing component has a positive heading which measures positive acceleration in a second direction oriented 180° relative to the first direction of the primary sensing component.

In some embodiments, the sensing element has three pairs of sensing axes, each of the three pairs of sensing axes being mutually orthogonal to each other, wherein the sensing element includes a primary sensing component and a secondary sensing component for each sensing axis which each measure acceleration along a respective sensing axis, wherein the primary sensing component for each sensing axis has a positive heading which measures positive acceleration in a first direction relative to the respective sensing axis and the secondary sensing component for each sensing axis has a positive heading which measures positive acceleration in a second direction oriented 180° relative to the first direction of the primary sensing component for respective sensing axis.

In some embodiments, the three pairs of sensing axes are formed from a common sensing element.

In some embodiments, the accelerometer may further comprise a temperature sensor and a memory having a mapping of temperature to temperature correction factors stored therein.

In accordance with a further aspect of the present disclosure, there is provided an electronic device, comprising: an accelerometer as described above or herein; a controller connected to the accelerometer; a memory connected to the controller for storing the calibration data for the accelerometer; the controller being configured to perform any of the methods described above or herein.

In accordance with a further aspect of the present disclosure, there is provided an electronic device, comprising: an accelerometer comprising a sensing element, wherein the sensing element includes a primary sensing component and a secondary sensing component which each measure acceleration along a first sensing axis, wherein the primary sensing component has a positive heading which measures positive acceleration in a first direction relative to the first sensing axis and the secondary sensing component has a positive heading which measures positive acceleration in a second direction oriented 180° relative to the first direction of the primary sensing component; a controller connected to the accelerometer; a memory connected to the controller for storing calibration data for the accelerometer; the controller, in a calibration mode, being configured to determine calibration parameters in accordance with acceleration calibration data from the accelerometer and store the calibration parameters in the memory; the controller, in a measuring mode, being configured to measure acceleration using the accelerometer and to adjust the measured acceleration in accordance with the calibration parameters stored in the memory. In some embodiments, the controller is configured to perform the features of the method described above. In some embodiments, the controller, in the calibration mode, is configured to measure first acceleration using the primary sensing component to obtain first calibration data, measure second acceleration using the secondary sensing component to obtain second acceleration calibration data, determine calibration parameters in accordance with the first acceleration calibration data and the second acceleration calibration data, the calibration parameters representing values for adjusting an acceleration measured using the accelerometer, and store the calibration parameters in the memory of the electronic device.

In some embodiments, the calibration parameters comprise a bias factor, and the controller, in the calibration mode, is configured to determine the bias factor for the first sensing axis using the first acceleration calibration data and the second acceleration calibration data.

In some embodiments, the controller, in the calibration mode, is configured to determine the bias factor as the average of the first acceleration calibration data and the second acceleration calibration data when the electronic device is in a first orientation. In other embodiments, the controller, in the calibration mode, is configured to determine the bias factor as the average of the first acceleration calibration data and the second acceleration calibration data when the electronic device is in a first and second orientation.

In some embodiments, the controller, in the calibration mode, is configured to determine a sensitivity of the first sensing axis, the method comprising aligning the first sensing axis with a force of gravity, and determining the sensitivity of the first sensing axis using the first acceleration calibration data and the second acceleration calibration data.

In some embodiments, the electronic device comprises a display screen, wherein the controller, in the calibration mode, is configured to display a prompt on the display screen, the prompt including an instruction to orient the electronic device in a predetermined orientation in which the first sensing axis is aligned with the force of gravity.

In some embodiments, the controller in the calibration mode is configured to transpose the sensitivity of the first sensing axis from a first coordinate system in which that first sensing axis is not in parallel alignment with the force of gravity to a second coordinate system wherein the first sensing axis is in parallel alignment with the force of gravity.

In some embodiments, the controller in the calibration mode determines when the accelerometer is stationary and calibrates the accelerometer when the accelerometer is stationary.

In some embodiments, the electronic device further comprises a low pass filter for filtering accelerometer measurements to remove a dynamic component caused by movement of the accelerometer.

In some embodiments, the controller in the calibration mode is configured to calibrate the accelerometer after the device is changed from a state in which it is powered off to a state in which it is powered on.

In some embodiments, the electronic device further comprises a low drop out regulator providing power to the accelerometer. In other embodiments, the accelerometer is a ratiometric accelerometer.

In some embodiments, the electronic device further comprises a temperature sensor for measuring a temperature of the accelerometer, wherein the memory contains a mapping of temperature to temperature correction factors, the controller in the measured mode being configured to determine a temperature correction factor for the accelerometer measurements in accordance with the measured temperature, and adjust the measured acceleration in accordance with the temperature correction factor.

Accelerometer measurements may suffer from a variety of errors. Some of the types of errors which may arise when an accelerometer is assembled into an electronic device are: (1) bias error (also referred to as offset error); (2) sensitivity error (also referred to as scale factor); (3) ratiometric errors; and (4)

temperature errors. Bias error is the difference between the ideal 0 g output and the 0 g output reported by the accelerometer. Each measurement axis of an accelerometer is typically aligned with an axis of the electronic device.

In a typical assembly into an electronic device, the x-axis and y-axis are aligned with a horizontal plane of the electronic device while the z-axis is aligned with a vertical plane of the device. Other alignments of the sensing axis could be used in other embodiments. In such an alignment, when the electronic device is positioned horizontally the accelerometer output should read the ideal 0 g offset voltage on the x-axis and y-axis when there is no bias error ($V_{dd}/2$ where $V_{dd}$ is the voltage supply to the accelerometer, for example, from the device battery) and +1 g output voltage on the z-axis ($V_{dd}/2 + S*1$ g, where S is the scale factor of the accelerometer in Volts/g). However, the accelerometer typically reads something different than the ideal output when the device is perfectly horizontal (e.g., when resting on perfectly horizontal surface). This may be the result of one or more of many factors including mechanical tolerances in the component parts (PCB, screws, standoffs, solder pads, etc.) of the accelerometer and/or its installation in the electronic device. To correct for bias error a bias factor, B, for a sensing axis may be determined.

Sensitivity error is the difference between the ideal 1 g output and the 1 g output reported by the accelerometer. Each measurement axis of an accelerometer has a scale factor or sensitivity measured in volts per g (V/g) or volts per mg (V/mg) which represents the change in the voltage output of the accelerometer proportionally to the change in g. Each accelerometer has an ideal scale factor; however, the actual change in output of the accelerometer in response to changes in g may differ from the ideal output. This may be the result of one or more of many factors, including manufacturing differences between accelerometers or problems during installation or assembly of the accelerometer into the electronic device. To correct for sensitivity error of a sensing axis of an accelerometer, a sensitivity, S, for the sensing axis may be determined.

Ratiometric errors arise through the use of a non-ratiometric analog-to-digital converter (ADC) in the accelerometer. Typically, accelerometer measurements are processed by a controller such as a processor, which may be a microprocessor. To process accelerometer measurements, such measurements are placed in a digital form rather than an analog form. This may be done through the use of a digital accelerometer, which has an internal analog-to-digital converter or through the use of an analog accelerometer combined with an external analog-to-digital converter. Ratiometric errors arise where the output of the analog-to-digital converter or the accelerometer does not scale by the same ratio that the voltage, $V_{dd}$, supplied to the accelerometer or analog-to-digital converter changes. That is, for a given acceleration, a ratiometric accelerometer or ratiometric analog-to-digital converter will have a different voltage output for a different supply voltage. With a ratiometric accelerometer or analog-to-digital converter, however, the ratio of the supply voltage to the output voltage for a given acceleration will be maintained, even when the supply voltage varies. For example, if the output voltage of a ratiometric accelerometer at a given acceleration is 2 volts when the supply voltage is 4 volts, then the output voltage for the same acceleration will be 2.5 volts when the supply voltage is 5 volts. That is, the in the example given, the output voltage will always be one half the supply voltage.

Temperature error, which is also known as temperature sensitivity, is the sensitivity of a given characteristic of the accelerometer, such as bias or scale factor, due to the operating temperature. That is, characteristics such as bias and/or scale factor may change with a change in operating temperature. Temperature sensitivity is often specified as a worst case value over the full operating temperature range. It may be expressed as the change of the characteristic per degree of temperature change which could be expressed, for example, in terms of $\mu g/^\circ$ C. or mg/$^\circ$ C. for bias.

The accelerometer may be calibrated or "zeroed" to account for at least some of these errors in subsequent measurements for improved accuracy. Such calibration may be performed by the accelerometer or electronic device manufacturer by measuring and storing the offset and sensitivity of the accelerometer as parameters in the built-in memory of the accelerometer (typically Electrically Erasable Programmable Read-Only Memory (EEPROM) or other flash memory). During subsequent measurements, these errors may be accounted for by adjusting the gain of the accelerometer by dividing by the sensitivity factor and subtracting the bias factor stored in the memory of the accelerometer, or memory of the host electronic device.

In accordance with example embodiments of the present disclosure, there is provided an accelerometer having improved calibration capabilities, an electronic device incorporating such an accelerometer, and a method for calibrating such an accelerometer. In accordance with some embodiments of the present disclosure, the calibration may be performed by the device itself or by a controller of the host electronic device. This calibration routine may be used to compliment or eliminate external calibration by the manufacturer.

Referring first to FIG. 1, an accelerometer 108 is shown located within an electronic device 102. The electronic device 102 may take many forms. By way of example and not limitation, the electronic device may be a global positioning system (GPS) unit, an inertial navigation system (INS), or a mobile communication device such as a mobile phone or smartphone. The electronic device 102 may be any electronic device which makes use of one or more accelerometers 108. In some embodiments, the electronic device 102 includes a display screen 104, such as a liquid crystal display (LCD), and an input mechanism 106, such as a keyboard or keypad or a navigation tool such as a clickable scroll wheel (also referred to as a track wheel or thumbwheel) or trackball. In some embodiments, the display 104 may be a touchscreen display which permits a user to provide input to the electronic device 102 by touching the display 104.

Figure 11:
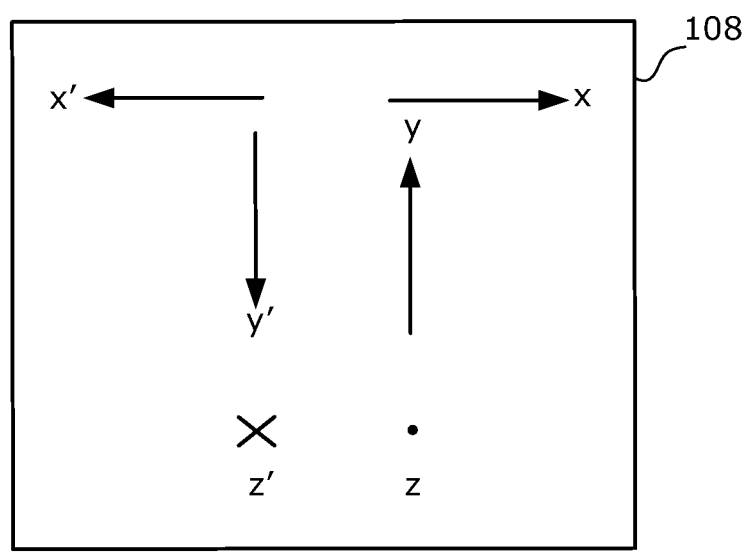
FIG. 11 is a planar view of an accelerometer in accordance with one example embodiment of the present disclosure illustrating a positive heading of the primary sensing components and second sensing components of the accelerometer in which positive acceleration is measured.

As shown in FIG. 1 and FIG. 11, the accelerometer 108 comprises a sensing element having three orthogonal sensing axes each having a primary sensing component for measuring along the respective sensing axis denoted x, y and z, and a secondary sensing component for measuring along the respective sensing axis denoted x', y' and z'. The primary sensing components are shown in solid lines and the secondary sensing components are shown in dotted lines. Each primary sensing component x, y, z has a positive heading which measures positive acceleration in a first direction relative to the respective sensing axis, and each secondary sensing component x', y', z' has a positive heading which measures positive acceleration in a second direction oriented 180° relative to the first direction of the primary sensing component for respective sensing axis. The accelerometer reading from the 6 sensing components are denoted $A_x$ and $A_{x'}$, $A_y$ and $A_{y'}$, $A_z$ and $A_{z'}$, and represent the readings of the first primary component x, first secondary component x', second primary component y, second secondary component y', third primary component z and third component secondary z' for the first, second and third sensing axes respectively.

It will be appreciated that the sensing element of the accelerometer 108 has three sensing axes, each of the three sensing axes being mutually orthogonal to each other, each of the three sensing axes comprising a primary component and a secondary sensing component. In some embodiments, the sensing axes are formed from a common sensing element. Methods of constructing accelerometers are well known in the art and will not be described herein.

In some embodiments, the accelerometer 108 may be a digital accelerometer provided in an integrated circuit (IC) having a memory such as Electrically Erasable Programmable Read-Only Memory (EEPROM) or flash memory, analog-to-digital (A/D) converter and a controller such as a suitably programmed microprocessor or Field Programmable Gate Array (FPGA). The IC may provide an industry standard interface such as an SPI (Serial Peripheral Interface) or I2C (Inter-Integrated Circuit) interface for connecting to a printed circuit board (PCB) of the electronic device 102.

As shown in FIG. 1, the primary sensing components x, y, z and secondary sensing components x', y', z' may be aligned with the form factor of the electronic device 102. In some embodiments, the x and x' sensing components are aligned about an axis extending longitudinally along the midpoint of the electronic device 102 between left and right sides 126, 128 of the electronic device 102, the y and y' sensing components are aligned about an axis extending laterally along the midpoint of the device 102 between top and bottom ends 122, 124, and the z and z' sensing components extend perpendicularly through the x-y plane defined by the x and y axes at the intersection (origin) of these axes. In this way, when the device 102 is oriented on a flat surface, such as a table (as shown, for example, in FIG. 4B), the x, x', y and y' sensing components are parallel to the table and the z and z' sensing components have the force of gravity operating directly upon them. It is contemplated that the primary sensing components x, y, z and secondary sensing components x', y', z' may be aligned with different features of the electronic device 102 in other embodiments.

The force of gravity provides a reliable source for the calibration of accelerometers after assembly into the electronic device 102. To measure the bias error and sensitivity error, and calculate the bias factor and sensitivity of each the three sensing axes sample measurements are taken using each of the primary and secondary sensing components, denoted $A_x$ and $A_{x'}$, $A_y$ and $A_{y'}$, $A_z$ and $A_{z'}$. Because of the mirrored axes, fewer measurements need to be taken to obtain reliable bias and scale factors for the sensing axes of the accelerometer 108. That is, in each orientation of the accelerometer, the use of the mirrored sensing components effectively provides two measurements for each of the sensing axes. A first measurement is taken along the primary sensing components denoted x, y and z and a second measurement is taken along the secondary sensing components denoted x', y' and z'.

Figure 2:
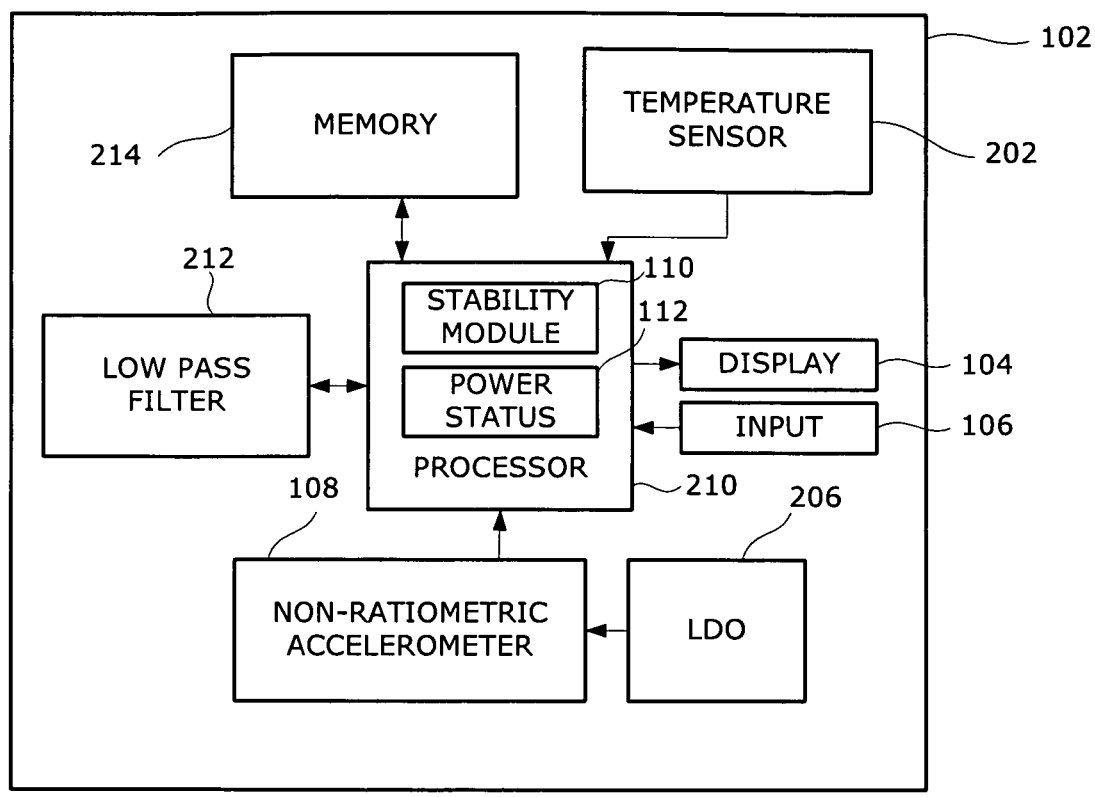
FIG. 2 is a block diagram of some components of an electronic device having a non-ratiometric accelerometer in accordance with an example embodiment of the present disclosure.

Referring now to FIG. 2, a block diagram of the electronic device 102 having a non-ratiometric accelerometer 108 is shown. The electronic device 102 includes a controller 210 for controlling the electronic device 102 and for performing a calibration routine to determine the bias factor, B, and sensitivity, S, for each of the sensing axes. In some embodiments, the controller 210 may interact with device subsystems such as the display 104 and/or the input mechanism 106. The controller 210 may be configured to control the display 104 and to cause appropriate information to be displayed on the display 104. The controller 210 may be a processor such as a microprocessor or microcontroller which operates under stored program control.

The controller 210 is connected to and receives measurements from the accelerometer 108 and is used, at least in part, to sample and hold measurements received from the accelerometer 108. As will be described in more detail below, these measurements may be used as part of a calibration routine to calculate the bias factors, B, and scale factors, S, for the sensing axes of the accelerometer 108.

The controller 210 is connected to a memory 214. The memory 214 may be used for storing bias factors and scale factors. The memory 214 may also be used to store program instructions for execution by the controller 210. For example, the memory 214 may contain instructions for execution by the controller 210 for performing the calibration routines described herein. While the memory 214 is illustrated in the block diagram using a single block, it will be appreciated that the memory may be comprised of a combination of memory elements such as, for example, flash memory, random access memory (RAM), and read only memory (ROM). In some embodiments, the controller 210 and the memory 214 may be comprised of a microcontroller having an integrated central processing unit and memory. A person skilled in the art will appreciate that a particular type of memory may be desirable for a specific purpose. For example, ROM may be used to store program instructions which do not need to be updated; however, such memory may not be desirable for storing elements which require periodic updating such as calibration information including biases and scale factors.

As shown in FIG. 2, in some embodiments to eliminate or reduce ratiometric errors, the electronic device 102 may include a low drop out regulator 206 (LDO) connected to the accelerometer 108. A low dropout regulator is a DC linear voltage regulator which can operate with a very small input-output differential voltage. That is, the LDO 206 can provide a constant output voltage to the accelerometer 108 even if the input voltage to the LDO 206 varies. The LDO 206 is therefore able to provide a constant input voltage to the accelerometer 108. If the accelerometer 108 is non-ratiometric, in which its output voltage for a given acceleration is dependent on the input voltage to the accelerometer 108, the LDO 206 ensures that the input voltage to the accelerometer 108 is constant so that the output voltage will be consistent for a given acceleration. Accordingly, in some embodiments, the LDO 206 is used with the accelerometer 108 to eliminate or reduce ratiometric errors.

The electronic device 102 also includes a battery (not shown) as a power source, which is typically one or more rechargeable batteries that may be charged through charging circuitry coupled to a battery interface (not shown) such as a serial data port. The battery provides electrical power to at least some of the electrical circuitry in the electronic device 102, and the battery interface provides a mechanical and electrical connection for the battery. The battery interface is coupled to a regulator (not shown) which provides power V+ to the circuitry of the electronic device 102.

Figure 3:
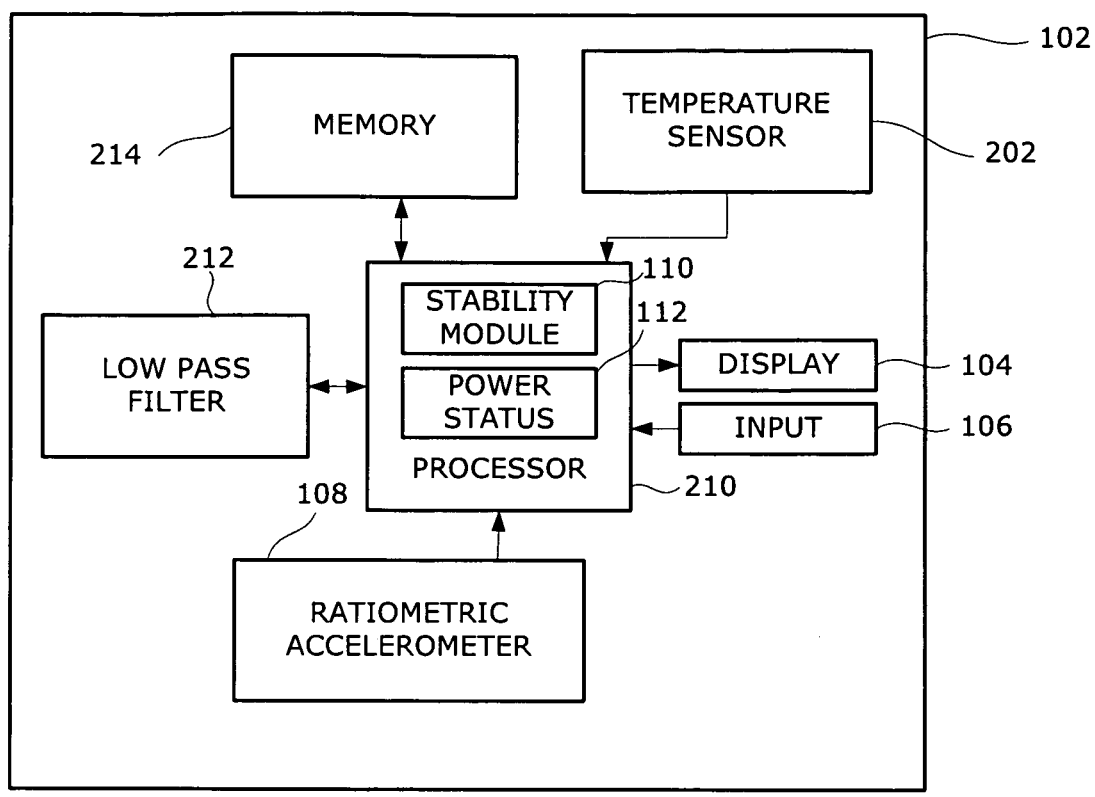
FIG. 3 is a block diagram of some components of an electronic device having a ratiometric accelerometer in accordance with another example embodiment of the present disclosure.

In other embodiments, such as that shown at FIG. 3, a ratiometric accelerometer 108 may be used. For a ratiometric accelerometer, as the supply voltage varies (for example, as a battery discharges), the output voltage of the accelerometer scales proportionately. Accordingly, the ratiometric accelerometer 108 may be used in some embodiments to eliminate ratiometric errors. The ratiometric accelerometer 108 is typically used instead of the LDO 206, but could be used in addition to it in some embodiments.

The electronic device 102 may also include a temperature sensor 202 connected to the controller 210 for determining temperature of the electronic device 102. The controller 210 may be configured to account for the temperature of the accelerometer 108 or electronic device 102 when calculating accelerations using the output voltage of the accelerometer 108 and the bias factors and scale factors. It will be appreciated that the temperature sensor 202 may take many forms such as, for example, an electrical resistance thermometer which has a resistance which varies with temperature.

In some embodiments, the temperature sensor 202 may utilize data stored in the memory 214 of the electronic device 102, such as a look-up table or formula, to determine a temperature correction factor to correct for bias factor and scale factor variations due to temperature in accordance with the measured temperature. That is, a temperature mapping may be used to determine a temperature compensation factor. Because temperature sensitivity may vary between accelerometers, the temperature mapping (e.g. the look-up table or formula) for a particular temperature may be constructed by measuring the accelerometer output over a range of temperatures in which the device 102 is intended to operate. The temperature correction factor can then be used to adjust the accelerometer output during measurement to compensate for the temperature sensitivity.

In some embodiments, the temperature sensor 202 may be provided with the accelerometer 108 in a common single IC. The temperature mapping (e.g. the look-up table or formula) data may be provided in a memory of the IC, such as EEPROM or flash memory. The IC may be further provided with an A/D converter to provide digital output, and a controller such as a suitably programmed microprocessor or FPGA. The IC may provide an industry standard interface such as an SPI or I2C interface for connecting to a PCB of the electronic device 102.

As will be described more fully below, the bias factor, B, and sensitivity, S, for each sensing axis may be calculated by obtaining an accelerometer measurement on each primary sensing axis component x, y, z and its corresponding secondary sensing component x', y', z'. It will be appreciated that, in some embodiments, the calibration routine for calibrating the accelerometer 108 of the electronic device 102 may be dynamic. That is, the calibration routine may be performed while the device 102 is moving. When the device 102 is moving, the accelerometer 108 measurements will include both a static acceleration component due to the force of gravity and a dynamic acceleration component due to the movement of the electronic device 102. The force of gravity is a constant force acting upon the device 102, while the movement of the electronic device 102 due to an externally applied force will vary over time. That is, the electronic device 102 will experience the same gravitational field irrespective of its movement. For example, when the electronic device 102 is placed upon a flat surface such as a table it will experience the same force of gravity that it will experience when it is moving in a car. Hence, the force of gravity is a static, or non-variable component acting upon the electronic device 102. However, the electronic device 102 will experience an additional external force when it is moving that is not present when it is at rest. The additional external force (or acceleration) typically varies over time; hence, it is a dynamic component.

Since the acceleration component due to gravity is constant, it provides a reliable standard for calibrating the accelerometer 108. Accordingly, in some embodiments, the electronic device 102 includes a low pass filter 212 for removing the dynamic (or non-gravitational) component from accelerometer measurements. By removing the non-gravitational component from accelerometer measurements, the acceleration component due to gravity may be separated and used by the controller 210 for calibrating the accelerometer 108 of the electronic device 102. The low pass filter 212 passes low frequency signals, such as the static component, but attenuates signals with frequencies higher than a cutoff frequency. The low pass filter 212 may be of a variety of types, such as, for example, a Butterworth filter (which is known in the art). The low pass filter 212 will typically be designed to have a very low cutoff frequency to ensure that the dynamic component of the accelerometer 108 measurements are filtered out, leaving only the static component.

In other embodiments, the electronic device 102 includes a stability determination module 110 for determining whether accelerometer measurements from the accelerometer 108 were taken at a point when the device was stable. In such embodiments, the calibration routine may only be performed if it is determined that the electronic device 102 was stable when the measurements were taken. The stability determination module 110 may be implemented using the controller 210. For example, the controller 210 may be configured to obtain measurements from the accelerometers over a predetermined period of time and to determine whether the measurements at each time period are sufficiently similar to one another. If the measurements at each time period are determined to be sufficiently similar to one another, then the stability determination module 110 will determine that the device 102 is sufficiently stable. It will be appreciated that the stability determination module 110 may take other forms and may employ other methods or hardware to determine whether the device is stable.

In some embodiments, the electronic device 102 may include a power status detection module 112. The power status detection module 112 may be used to detect a power cycle of the electronic device 102. A power cycle occurs when the device 102 is powered off and then powered back on. When a power cycle occurs, the operating characteristics of the electronic device 102 may change and calibration data which was calculated prior to the power cycle may no longer be accurate. In particular, the bias error of each sensing component x, y, z, of the accelerometer may shift and the bias factor, B, for each primary sensing component x, y, z which was calculated prior to the power cycle may no longer be accurate. The sensitivity error may also change. Typically, however, the sensitivity will change to a lesser extent than the bias error. Accordingly, in some embodiments, the controller 210 is configured to recalibrate the accelerometer 108 following the detection of a power cycle by the power status detection module 112. The power status detection module 112 may be implemented, at least in part, by the controller 210. The specific form of the power detection module 112 will, however, vary based on the specific design of the electronic device 102.

In some embodiments, only the bias factor, B, for each primary sensing components x, y, z will be re-determined following a power cycle. However, in other embodiments, the sensitivity, S, for each primary sensing components x, y, z will be re-determined following a power cycle.

Figure 5:
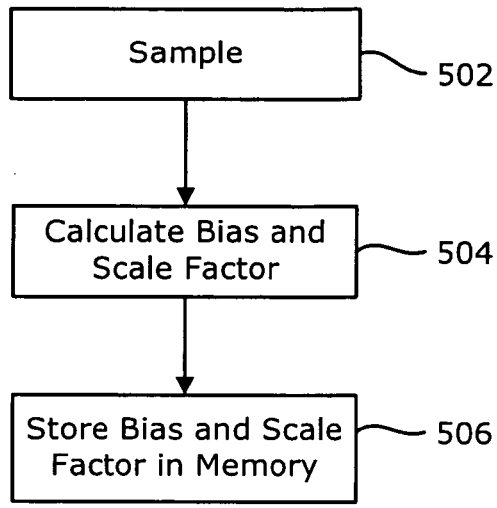
FIG. 5 is a flowchart illustrating example operations for calibrating an accelerometer.

Referring now to FIG. 5, a method of calibrating an accelerometer in accordance with one aspect of the present disclosure will be described. The method may be implemented by any electronic device having a six-axis accelerometer 108 described herein, such as those of FIGS. 1 to 3. In a first step 502, the accelerometer 108 is sampled to obtain measurements on the primary sensing components x, y, z and the corresponding secondary sensing components x', y', z' of the accelerometer 108. The accelerometer measurements are received at the controller 210 for processing.

Next, at step 504 a bias factor, B, and, in some embodiments, a sensitivity, S, is calculated for at least one primary sensing component x, y or z. The bias factor, B, for a primary sensing component x, y or z is calculated based on the accelerometer measurements from that primary sensing component x, y, or z, and the accelerometer measurements from the secondary sensing axis x', y', z' corresponding to that primary sensing component x, y or z. The bias factor, B, for each primary sensing component x, y, z, may be calculated as an average of the accelerometer measurements from that primary sensing component and the accelerometer measurements from the corresponding secondary sensing component x', y', z'. That is, the bias factor, B, for each primary sensing component may be calculated using equation (1):

$$B = \frac{A + A'}{2} \quad (1)$$

where B is the bias factor, A is the accelerometer measurement from the primary sensing component x, y or z for which the bias factor, B, is being calculated, and A' is the accelerometer measurement from the secondary sensing component x', y' or z' which corresponds to the primary sensing component for which the bias factor is being calculated. For example, for an accelerometer having three primary sensing components, such as that shown in FIG. 1, three bias factors, denoted $B_x$, $B_y$, $B_z$, may be calculated; each corresponding to a different primary sensing component x, y, z. These bias factors may be calculated according to equations (2), (3) and (4):

$$B_x = \frac{A_x + A_{x'}}{2} \quad (2)$$

$$B_y = \frac{A_y + A_{y'}}{2} \quad (3)$$

$$B_z = \frac{A_z + A_{z'}}{2} \quad (4)$$

where $B_x$, $B_y$, and $B_z$ are the bias factors for the x, y and z primary sensing components respectively, $A_x$, $A_y$, $A_z$ are the accelerometer measurements from the x, y and z primary sensing components respectively and $A_{x'}$, $A_{y'}$, $A_{z'}$ are the accelerometer measurements from the x', y' and z' secondary sensing components respectively.

In embodiments in which the accelerometer has a secondary sensing component x', y', and z' oriented parallel to and in the opposite direction of each of primary sensing component, such as in the embodiment shown in FIG. 1, a bias factor may be easily determined from the above equations when the accelerometer 108 is in any given orientation. In such embodiment, it may be assumed that each primary sensing component x, y, z has approximately the same bias error and sensitivity error as its corresponding secondary sensing component x', y', z'. In other words, the bias factor, B, for the primary sensing component x, y, z will be the same as the bias factor, B, for the corresponding secondary sensing component x', y', z' and the scale factor, S, for the primary sensing component x, y, z will be the same as the scale factor, S, for the corresponding secondary sensing component x', y', z'.

Since each primary sensing component x, y, z is oriented 180 degrees out of phase with its corresponding secondary sensing component x', y', z', (i.e. parallel to and in the opposite direction of the corresponding secondary sensing component) the acceleration on the primary sensing component x, y, z will be of the same magnitude as the acceleration on the secondary sensing component x, y, z, but will have the opposite sign. For example, if the accelerometer 108 were oriented as shown in FIGS. 1 and 4B, where one of the primary sensing component z is oriented so that it points upwardly, and where the corresponding secondary sensing component z' is oriented so that it points downwardly in the same direction as the gravitational force, the primary sensing component will experience an acceleration of −1 g and the secondary sensing component will experience an acceleration of +1 g.

Since the bias factor and sensitivity of each primary sensing component x, y, z is approximately the same as the bias factor and sensitivity of the corresponding secondary sensing component x', y', z' and since the acceleration on each primary sensing component x, y, z is of the same magnitude but in the opposite direction as the bias factor for the corresponding secondary sensing component x', y', z', the bias factor may be calculated as an average of the accelerometer measurement in volts on the primary sensing component x, y, z and the corresponding secondary sensing component x', y', z'. That is, the accelerometer measurement on one of the primary sensing component may be determined from equation (5):

$$A = (Accel \times S) + B \quad (5)$$

where A is the accelerometer measurement on the primary sensing component x, y or z, (typically in volts), Accel is the acceleration experienced at the primary sensing component x, y, or z (typically in g), S is the sensitivity of the primary sensing component (typically in Volts/g), and B is the bias factor of the primary sensing component (typically in Volts). Similarly, the measurement on the corresponding sensing axis may be determined from the following equation:

$$A' = (Accel' \times S') + B' \quad (6)$$

where A' is the accelerometer measurement on the secondary sensing component x', y' or z', (typically in volts), Accel' is the acceleration experienced at the secondary sensing component x, y, or z (typically in g), S' is the sensitivity of the secondary sensing components (typically in Volts/g), and B is the bias factor of the secondary sensing components (typically in Volts). Since Accel=−Accel', S=S', and B=B', equations (5) and (6) may be solved for B to yield equation (1):

$$B = \frac{A + A'}{2} \quad (1)$$

Accordingly, it can be seen that the secondary sensing components x', y', z' permit the bias factor, B, for each primary sensing component x, y, z to be easily determined when the accelerometer 108 is in any orientation.

While it is possible to determine the bias factor, B, for each primary sensing component with readings from the accelerometer when the accelerometer is in a single orientation, it will be appreciated that in some embodiments, the bias factor, B, for each primary sensing component x, y, z, may be determined based on the accelerometer readings when the accelerometer is in more than one orientation. Obtaining such additional measurements may further increase the accuracy of the bias factor. For example, in some embodiments, first accelerometer measurements are obtained when the accelerometer 108 is in a first orientation and second accelerometer measurements are obtained when the accelerometer 108 is in a second orientation, which is different from the first orientation. A bias factor may then be calculated based on the first accelerometer measurements and the second accelerometer measurements. The bias factor for each primary sensing component x, y or z, may be calculated as the average of the accelerometer measurement from the primary sensing component x, y or z and the corresponding secondary sensing component x', y' or z' in each orientation. Where there are two orientations, the bias factor, B, may be calculated according to equation (7):

$$B = \frac{A_1 + A_1' + A_2 + A_2'}{4} \quad (7)$$

where $A_1$ is the accelerometer measurement from the primary sensing component x, y, z for which the bias factor, B, is being calculated when the accelerometer is in the first orientation, and $A_1'$ is the accelerometer measurement from the secondary sensing component x', y', z' which corresponds to the primary sensing component x, y, z, for which the bias factor is being calculated when the accelerometer is in the first orientation, $A_2$ is the accelerometer measurement from the primary sensing component x, y or z when the accelerometer is in the second orientation, and $A_2'$ is the accelerometer measurement from the secondary sensing component x', y', or z' when the accelerometer is in the second orientation.

As noted above, in the step 504 the scale factor or sensitivity, S, of each primary sensing component x, y, or z may also be calculated. The sensitivity of any one or more of the primary sensing component x, y and z may be determined by obtaining an accelerometer measurement when that primary sensing component x, y or z of the accelerometer 108 is experiencing a known acceleration. The force of gravity may be used for a reference point for determining the sensitivity of each primary sensing components x, y and z.

Referring to FIGS. 4A to 4C, to use the gravitational force for calibration of one of the primary sensing components x, y or z, the primary sensing components x, y, or z may be aligned so that it is parallel to the force of gravity 400 of the earth's gravitational field. In this orientation, an accelerometer measurement is taken at the primary sensing component x, y or z and the secondary sensing component x', y', z' that are aligned with the force of gravity 400. The sensitivity, S, for each primary sensing component x, y, z may be calculated when that primary sensing component x, y or z is parallel to the force of gravity 400. Accordingly, for an accelerometer 108 having three independent primary sensing components x, y and z, such as the accelerometer 108 of FIG. 1, the sensitivity of each primary sensing component may be determined by placing that primary sensing component in an one of three different orientations. The three orientations are illustrated in FIGS. 4A, 4B and 4C.

In FIG. 4A, the accelerometer is oriented in a first position in which the primary sensing component y and the secondary sensing component y' are placed in parallel alignment with the force of gravity 400. Accelerometer measurements on the primary sensing component y are taken and accelerometer measurements on the secondary sensing component y' may also be taken. The sensitivity, $S_y$, of the primary sensing component y may be calculated using these measurements.

In FIG. 4B, the accelerometer is oriented in a second position in which the primary sensing component t z and secondary sensing component z' are in parallel alignment with the force of gravity 400. Accelerometer measurements are taken from the primary sensing component z and, in some embodiments, from the secondary sensing component z' of the accelerometer 108. The sensitivity, $S_z$, of the second primary sensing component z may be determined from the measurements taken on the primary sensing component z and, in some embodiments, the secondary sensing component.

In FIG. 4C, the accelerometer 108 is oriented in a third position in which the primary sensing component x and the secondary sensing component x' are in parallel alignment with the force of gravity 400. In this orientation, accelerometer measurements are taken from the primary sensing component x of the accelerometer 108 and, in some embodiments, from the secondary sensing component x' of the accelerometer. The sensitivity, $S_x$, of the primary sensing component may be determined from the measurements taken on the primary sensing component x in the position and, in some embodiments, the measurements taken on the secondary sensing component.

The accelerations experienced on each primary sensing component x, y, and z and secondary sensing component x', y', z', when the accelerometer is in each of the reference positions of FIGS. 4A, 4B and 4C are as follows:

| Sensing Axis | Position 1 (FIG. 4A) (y and y' aligned with g or vertical) | Position 2 (FIG. 4B) (z and z' aligned with g or vertical) | Position 3 (FIG. 4C) (x and x' aligned with g or vertical) |
|---|---|---|---|
| x | 0 | 0 | −1 g |
| x' | 0 | 0 | +1 g |
| y | −1 g | 0 | 0 |
| y' | +1 g | 0 | 0 |
| z | 0 | −1 g | 0 |
| z' | 0 | +1 g | 0 |

The sensitivity of each of the primary sensing component x, y, z may be calculated using the measurements taken on the primary sensing component x, y, z when that primary sensing component is in parallel alignment with the force of gravity 400 using equation (8a) or (8b):

$$S = \frac{A - B}{1g} \quad (8a)$$

$$S = \frac{A' - A}{2} \quad (8b)$$

where S is the sensitivity, A' is the accelerometer reading from the primary sensing component (e.g. x, y or z, typically in volts) when the primary sensing component is aligned with the force of gravity, and A is the accelerometer reading from the secondary sensing component (e.g. x', y' or z', typically in volts) when the secondary sensing component is aligned with the force of gravity, and B is the bias factor of that primary sensing component (typically in volts). Accordingly, in some embodiments, the sensitivity of each primary sensing component x, y, z is calculated using the acceleration measurement taken along that primary sensing component x, y, or z when that primary sensing component x, y or z is in parallel alignment with the force of gravity 400. It will be appreciated that, in embodiments in which equation (8a) is used to calculate the sensitivity, the bias factor, B, must first be determined.

Using equation (8b), the sensitivities of each primary sensing component may be calculated as half of the difference between the accelerometer measurement on that primary sensing component and the accelerometer measurement on that secondary sensing component when that primary sensing component and that secondary sensing component are in parallel alignment with the force of gravity 400. That is, the sensitivity of the primary sensing components x, y, z may be calculated using equations (9) to (11):

$$S_x = \frac{(A_{x'} - A_x)}{2} \tag{9}$$

$$S_y = \frac{(A_{y'} - A_y)}{2} \tag{10}$$

$$S_z = \frac{(A_{z'} - A_z)}{2} \tag{11}$$

where $S_x$, $S_y$, and $S_z$ are the sensitivities for the first, x, second, y, and third, z, primary sensing components respectively, $A_x$, $A_y$, $A_z$ are the accelerometer measurements from the first, x, second, y, and third, z primary sensing components respectively and $A_{x'}$, $A_{y'}$, $A_{z'}$ are the accelerometer measurements from the first, x', second, y', and third, z', secondary sensing components respectively.

By using the secondary sensing components x', y', z', sensitivities may be calculated without the need to rely on previously calculated bias factors, B. Accordingly, through the use of the secondary sensing components x', y', z', the sensitivity of each primary sensing components may be calculated even when the bias factor, B, has not been determined. Also, by using the additional measurements from the secondary sensing components x', y', z' in addition to the measurements of the primary sensing components x, y, z, the calculated sensitivity may have a greater degree of accuracy relative to the actual sensitivity of the accelerometer 108.

As discussed above, in some embodiments the bias factor, B, of each of the primary sensing components x, y, z is calculated without orienting the accelerometer 108 in the positions of FIGS. 4A to 4C. However, in some embodiments, bias factors are calculated for a primary sensing components x, y or z, using measurements taken when that primary sensing component is perpendicular or approximately perpendicular to the force of gravity 400 and the acceleration on that primary sensing component and its corresponding secondary sensing component is approximately 0 g. In some applications, the latter approach may provide more accurate measurements of the bias factors, since it minimizes the effect of unequal sensitivity measurements. That is, to use equation (1) for calculating bias factors using measurements that are taken at a point where the primary sensing component and secondary sensing component have not been aligned substantially perpendicular to the force of gravity 400, an assumption was made that the sensitivity of the primary sensing component is equal to the sensitivity of the secondary sensing component (i.e. S=S'). Constructing or otherwise forming the sensing axes in a common sensing element (i.e., in the same physical sensing part) increases the likelihood that the sensitivity of the primary sensing component is equal to the sensitivity of the secondary sensing component as both axes are manufactured from the same materials, for example, from the same silicon and glass substrates at the same time. Methods of constructing accelerometers are well known in the art and will not be described herein.

To account for differences in the sensitivities of the primary sensing component and the secondary sensing component, in some embodiments the bias factor is calculated using measurements taken when the acceleration on the sensing axis is at or close to 0 g. It may be seen, for example, from equations (5) and (6) that as the acceleration approaches zero, the product of acceleration and sensitivity also approaches zero and the effect of the sensitivity on the bias factor measurement is minimized. If the acceleration is exactly 0 g, then the sensitivity has no effect on the bias factor measurement since the bias factor is simply equal to the accelerometer measurement when the sensing axis is in a position in which it experiences 0 g of acceleration.

Accordingly, in some embodiments, the bias factors, B, may be calculated based on measurements taken at the primary sensing components x, y, z and the secondary sensing components x', y', z' when the accelerometer is in the orientations shown in FIGS. 4A, 4B, and 4C. That is, the bias factor calculations may be performed using measurements on the primary sensing components x, y, z and secondary sensing components x', y', z' when the primary sensing components and secondary sensing components are in the 0 g position in which they are perpendicular to the force of gravity 400 and they do not sense any effect from the force of gravity 400.

As noted above, it may be seen from equation (5) and (6) that the bias factor of each primary sensing component x, y or z is simply equal to the accelerometer measurement on that primary sensing component when the acceleration on that primary sensing component is zero. However, in practice, it may be difficult to ensure that the primary sensing component is exactly perpendicular to the force of gravity 400 so that the acceleration on that component is zero. Accordingly, for greater accuracy of calculated bias factors, in some embodiments, the bias factors are calculated by averaging accelerometer measurements obtained from the primary sensing component and the secondary sensing component when that primary sensing component is oriented perpendicular to the force of gravity 400. For example, the bias factor of each of the primary sensing components can be calibrated in accordance with equations (12) to (14) as follows:

$$B_x = \frac{(A_{x1} + A_{x'1} + A_{x2} + A_{x'2})}{4} \tag{12}$$

$$B_y = \frac{(A_{y2} + A_{y'2} + A_{y3} + A_{y'3})}{4} \tag{13}$$

$$B_z = \frac{(A_{z1} + A_{z'1} + A_{z3} + A_{z'3})}{4} \tag{14}$$

where $B_x$, $B_y$ and $B_z$ represent the bias factor of the x, y and z primary sensing components respectively, $A_{x1}$, $A_{z1}$ are accelerometer measurements taken on the x and z primary sensing component respectively when the y primary sensing component is in parallel alignment with the force of gravity 400, $A_{x'1}$, $A_{z'1}$ are accelerometer measurements taken on the x' and z' secondary sensing component respectively when the y' secondary sensing component is in parallel alignment with the force of gravity 400, $A_{x2}$, $A_{y2}$ are accelerometer measurements taken on the x and y primary sensing components respectively when the third z primary sensing component is in parallel alignment with the force of gravity 400, $A_{x'2}$, $A_{y'2}$ are accelerometer measurements taken on the first x' and second y' secondary sensing component respectively when the third z' secondary sensing component is in parallel alignment with the force of gravity 400, $A_{y3}$, $A_{z3}$ are accelerometer measurements taken on the y and z primary sensing components respectively when the x primary sensing component is in parallel alignment with the force of gravity 400, and $A_{y'3}$, $A_{z'3}$ are accelerometer measurements taken on the y' and third z' secondary sensing components respectively when the x primary sensing component is in parallel alignment with the force of gravity 400.

It may be seen from equations (12), (13) and (14) that the use of both measurements from the secondary sensing components x', y', z' and measurements from the primary sensing components x, y, z provides a greater number of accelerometer measurements for a given number of orientations than if only measurements from primary axes were used.

Next, in step 506 the calculated bias factors and/or sensitivities are calculated are stored in memory 214 of the electronic device, or possibly an onboard memory of the accelerometer 108. In at least some embodiments, the bias factors and/or sensitivities are stored to a non-volatile area of memory 214 so that they will remain in the memory 214 in the event of a loss of power to the memory 214.

Figure 6:
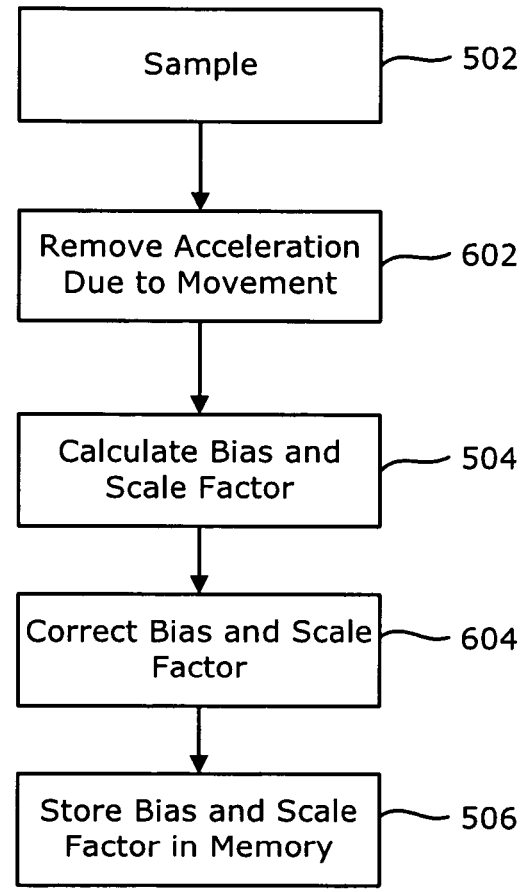
FIG. 6 is a flowchart illustrating example operations of a dynamic method of calibrating an accelerometer in accordance with an example embodiment of the present disclosure.
Figure 7D:
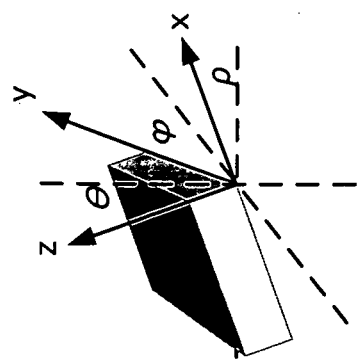
FIGS. 7A to 7D are schematic diagrams illustrating pitch ($\rho$), roll ($\phi$), and theta ($\theta$) angles of the primary sensing components of a six-axis accelerometer in accordance with example embodiments of the present disclosure.
Figure 7C:
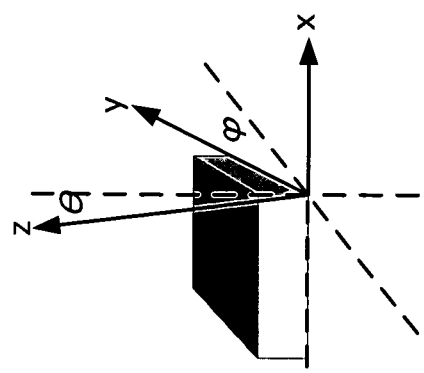
Figure 7B:
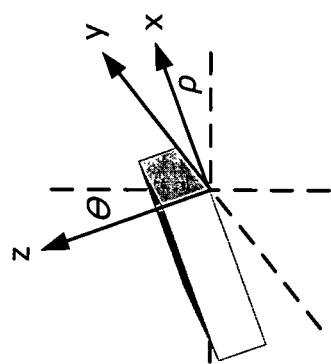
Figure 7A:
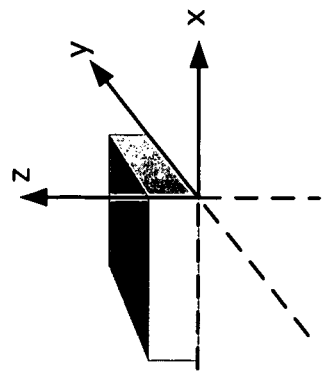

Referring now to FIG. 6, a dynamic method of calibrating an accelerometer in accordance with an example embodiment of the present disclosure will be described. The method is similar to that of FIG. 5, differing in that the accelerometer measurements in step 502 are taken while the accelerometer 108 is in motion. While in motion, the accelerometer 108 will experience two acceleration components: a static component due to the force of gravity acting on the accelerometer 108 and a dynamic component due to the movement of the accelerometer 108. Since some of the calibration routines discussed above rely on the use of a known acceleration component, such as the static component due to gravity, it is sometimes desirable to remove the acceleration component due to the movement of the accelerometer 108.

The method illustrated in FIG. 6 further includes, after taking the acceleration measurements in step 502, a step 602 of removing the dynamic acceleration component from the accelerometer measurements. The dynamic component is a higher frequency component than the static component. Accordingly, the dynamic component may be removed by filtering the accelerometer measurements with a low pass filter 212 to remove the high frequency dynamic component.

Next, in step 504 the bias factors and/or sensitivities are calculated based on the filtered accelerometer measurements in the manner described above.

Next, in step 604 the bias factors and/or sensitivities calculated in step 504 are adjusted using the tilt or orientation of the electronic device 102. As discussed above, it may be necessary or desirable to obtain accelerometer measurements when the electronic device is oriented such that the primary sensing components are in perpendicular or parallel alignment with the force of gravity 400 when calculating the bias factors and/or sensitivities respectively. Step 604 adjusts the calculated bias factors and/or sensitivities based on the tilt or orientation of the electronic device 102 when the measurements where taken (i.e., during the sampling in step 502). This avoids the requirement that the accelerometer 108 and/or electronic device 102 be positioned in the device orientations of FIGS. 4A, 4B and 4C during calibration.

To correct bias factors, the step 604 may include performing calculations to transpose bias factors for one or more primary sensing components x, y, z from a coordinate system in which the primary sensing components x, y, z and the corresponding secondary sensing components x', y', or z' are not perpendicular to the force of gravity 400 to a second coordinate system in which the primary sensing components and the corresponding secondary sensing components are each perpendicular to the force of gravity 400 of the earth. To correct sensitivities, step 604 may include performing calculations to transpose the sensitivity for one or more primary sensing components from a coordinate system in which the primary sensing components x, y, z and the corresponding secondary sensing components x', y', z' are not in parallel alignment with the force of gravity 400 to a coordinate system in which the primary sensing components and the corresponding secondary sensing components are each in parallel alignment with the force of gravity 400.

To adjust the bias factors and/or sensitivities, various angles which define the device orientation when the acceleration measurements were taken are calculated. These angles are shown in FIGS. 7A, 7B, 7C and 7D. Pitch (ρ) is defined as the angle of the first primary sensing component x relative to a horizontal plane extending perpendicular to the force of gravity at a given location (referred in layman's terms as the ground). Roll (φ) is defined as the angle of the second primary sensing component relative to the horizontal plane. Theta (θ) is the angle of the third primary sensing component z relative to the force of gravity 400. The pitch (ρ), roll (φ), and theta (θ) angles of a three-axis accelerometer 108 may be calculated using accelerometer measurements using equations (15), (16) and (17):

$$\phi = \arctan\left(\frac{A_y}{\sqrt{A_x^2 + A_z^2}}\right) \quad (15)$$

$$\rho = \arctan\left(\frac{A_x}{\sqrt{A_y^2 + A_z^2}}\right) \quad (16)$$

$$\theta = \arctan\left(\frac{\sqrt{A_x^2 + A_y^2}}{A_z}\right) \quad (17)$$

where $A_x$, $A_y$ and $A_z$ are the measurements from the first x, second y, and third z primary sensing components of the accelerometer 108 respectively. It will be appreciated that pitch (ρ), roll (φ) and theta (θ) can also be calculated by other means.

Using the pitch (ρ), roll (φ) and theta (θ) angles, the bias factors can be translated using trigonometric relationships to a coordinate system in which that primary sensing component x, y, or z is perpendicular to the force of gravity 400. Similarly, using the pitch (ρ), roll (φ) and theta (θ) angles, the sensitivities can be translated using trigonometric relationships to a coordinate system in which that primary sensing component x, y, or z is parallel to the force of gravity 400.

It will be appreciated that, in some embodiments, the coordinate system translation discussed above may be performed using only two of the pitch (ρ), roll (φ) and theta (θ) angles. Since the primary sensing components x, y, z are mutually orthogonal, it is possible to correct the alignment using only two of these angles. Accordingly, in some embodiments, the calibration method includes steps of calculating at least two of the pitch, roll and theta angles, and using the calculated angles to translate the bias factors and sensitivities. It will be appreciated that other methods of mathematically translating the bias factors and/or sensitivities which do not include a step of calculating these angles are also contemplated.

Next, in step 506 the calculated bias factors and/or sensitivities are calculated are stored in memory 214 of the electronic device, or possibly an onboard memory of the accelerometer 108.

In other embodiments, rather than adjusted the calculated bias factors and/or sensitivities in accordance with the device the tilt or orientation, the acceleration measurements taken on the primary and secondary sensing components are adjusted using the tilt or orientation of the electronic device 102, for example, using two or more of the pitch (ρ), roll (φ) and theta (θ) angles.

Figure 8:
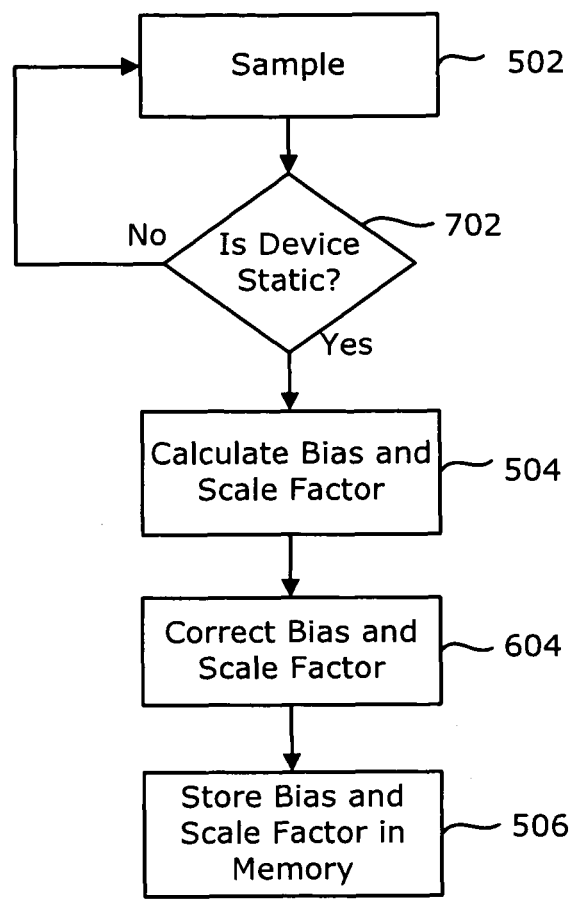
FIG. 8 is a flow diagram illustrating example operations of a dynamic method of calibrating an accelerometer in accordance with one example embodiment of the present disclosure.

Referring now to FIG. 8, a method of calibrating an accelerometer in accordance with another example embodiment of the present disclosure will be described. The method is similar to that of FIG. 6, differing in that the accelerometer measurements are taken while the accelerometer 108 is stable and not in motion. In this way, the measurements which are taken and used for calibration contain only a static component and do not contain a dynamic component. Such embodiments may include a step 702 of determining whether the electronic device and/or accelerometer 108 is stationary at the time period during which the accelerometer measurements were taken. If the electronic device and/or accelerometer 108 was not stationary, the sample data taken by the accelerometer 108 is discarded. If the accelerometer 108 was stationary, the bias factors and/or sensitivities are calculated as in step 504 described above. Various methods may be employed to determine whether the accelerometer 108 was stationary when the measurements were taken. In some embodiments, a series of accelerometer measurements may be taken at different times. A comparison may be made to determine whether the accelerometer measurements taken at each time period is sufficiently similar (for example, if the measurements are within a predetermined variance threshold). If the accelerometer measurements taken at each time period are sufficiently similar, a determination may be made that the accelerometer was stationary.

Next, step 604 is performed to adjust the bias factors and/or sensitivities calculated in step 504 are adjusted using the tilt or orientation of the electronic device 102.

Next, in step 506 the calculated bias factors and/or sensitivities are calculated are stored in memory 214 of the electronic device, or possibly an onboard memory of the accelerometer 108.

Figure 9:
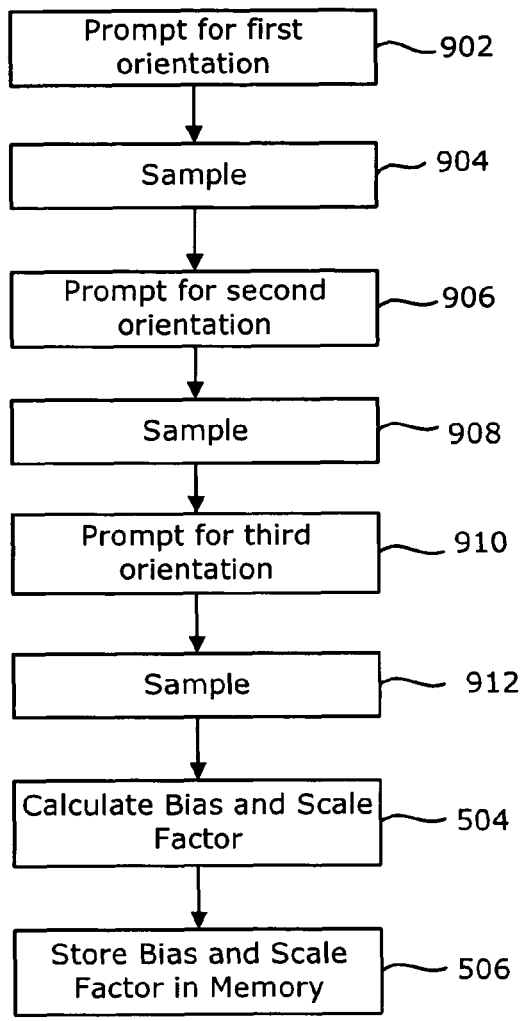
FIG. 9 is a flow diagram illustrating example operations of a user assisted method of calibrating an accelerometer in accordance with one example embodiment of the present disclosure.

Referring now to FIG. 9, a user assisted method of calibrating an accelerometer in accordance with one embodiment of the present disclosure will be described. The user assisted calibration method routine is for an accelerometer having three primary sensing components x, y, z; however, it could be adapted for an accelerometer one or two sensing axes. In the first step 902, the device user is prompted to orient the accelerometer 108 in a first predetermined orientation. The first predetermined orientation may be any one of the orientations shown in FIG. 4A, 4B, or 4C. That is, in the first predetermined orientation, one of the primary sensing component x, y, z is aligned, or substantially aligned, with the force of gravity 400 so as to extend parallel to it.

During the prompting step 902, the controller 210 may cause the display 104 to display a prompt for the device user to orient the electronic device 102 in the first predetermined orientation. For example, the display 104 may display a graphic image such as a bitmap image retrieved from memory 214 which illustrates the electronic device 102 in the first predetermined orientation. Other methods of prompting the user are also possible (such as a message prompt) and will depend on the specific nature and hardware capabilities of the device 102. For example, in some embodiments, the device 102 may be connected to an internal or external speaker (not shown) which may provide audible instructions to the user.

Next, in step 904 the accelerometer 108 is sampled to obtain accelerometer measurements when in the first predetermined orientation.

Next, at step 906 the device 102 prompts the user to orient the device 102 in a second predetermined orientation. In the second predetermined orientation, another one of the primary sensing components x, y, z of the accelerometer 108 is placed in parallel alignment with the force of gravity 400. Following this alignment, at step 908, the accelerometer 108 is sampled to obtain accelerometer measurements when in the second predetermined orientation.

Next, at step 910, the device 102 prompts the user to orient the device 102 in a third predetermined orientation. In the third orientation, the remaining one of the primary sensing components x, y, z of the accelerometer 108 is placed in parallel alignment with the force of gravity 400. Following this alignment, at step 912, the accelerometer 108 is again sampled to obtain accelerometer measurements when in the third predetermined orientation. It will be appreciated that, in each of the first predetermined orientation, second predetermined orientation, and third predetermined orientation, a different one of the primary sensing components x, y, or z will be in parallel alignment with the gravitational field so that the orientations in each of FIGS. 4A, 4B and 4C are realized.

In some embodiments, to provide some assurance that the electronic device 102 is in the proper orientation before sampling, the controller 210 is configured to wait a predetermined period of time following the steps 902, 906, 910 of prompting before obtaining accelerometer measurements at steps 904, 908, 912. The predetermined period of time is an amount of time that is typically sufficient to permit an average user sufficient time to interpret the prompt and orient the device 102 accordingly. In other embodiments, the user may be instructed, during the steps of prompting the user 902, 906, 910, to enter a predetermined input sequence using the input mechanism 106 when the device 102 has been placed in the desired orientation; for example, using the input mechanism 106. In such embodiments, the controller 210 may be configured to obtain the accelerometer measurements at steps 904, 908, and 912 after the predetermined input sequence is input.

In other embodiments, the controller 210 may be configured to monitor accelerometer readings and to sample and hold the accelerometer measurements at steps 904, 908, 912 when the accelerometer readings suggest that the user has oriented the electronic device 102 in the desired orientation. For example, when a component axis is parallel to and in the same direction as the force of gravity 400, it will typically have a larger accelerometer measurement (measured in voltage) due to gravity than a component that is perpendicular to the force of gravity 400, since the component that is parallel to and in the same direction of gravity experiences an acceleration of 1 g while the component that is perpendicular to the force of gravity 400 experiences an acceleration of 0 g. Accordingly, the controller 210 may be configured to determine whether the electronic device 102 is properly aligned by comparing the relative accelerometer measurements due to the force of gravity 400 on a plurality of sensing components x, y, z, x', y' or z'. Other methods of determining whether the user has oriented the electronic device 102 in the desired orientation are also possible.

Next, bias factors, B, and sensitivities, S, for each of the primary sensing components x, y, z are calculated at step 504. In some embodiments, this calculation may be made after the accelerometer 108 has been placed in all three orientations and all measurements are obtained from the accelerometer 108. In other embodiments, calculations may be made as the accelerometer measurements which are needed to make those calculations become available. For example, the sensitivity, S, for the primary sensing component x, y or z that is in parallel alignment with force of gravity 400 in the first predetermined orientation may be calculated after accelerometer measurements are obtained at step 904 from the electronic device 102 when it is in the first orientation.

Figure 10:
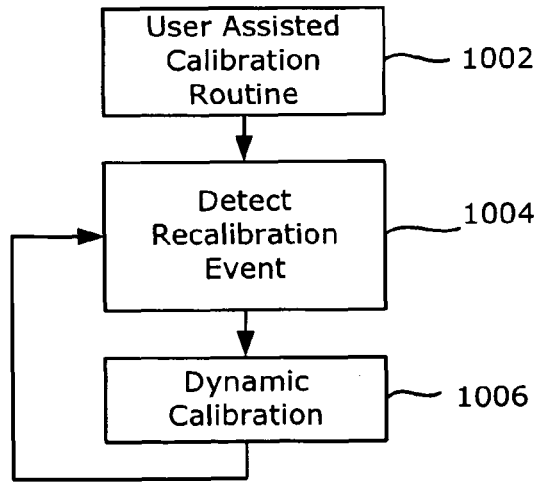
FIG. 10 is a flow diagram illustrating example operations of a method of calibrating an accelerometer which uses both user-assisted calibration techniques and dynamic calibration techniques in accordance with one example embodiment of the present disclosure.

Referring now to FIG. 10, a user assisted method of calibrating an accelerometer in accordance with another embodiment of the present disclosure will be described. The shown method includes a combination of at least one user assisted calibration routine and at least one dynamic calibration routine which is not user assisted. The user assisted calibration routine and dynamic calibration routine occur after a different predetermined event.

In a first step 1002, the electronic device 102 executes a user assisted calibration routine such as the user assisted calibration routine described above and illustrated at FIG. 9. In some embodiments, the user assisted calibration routine may be performed by the electronic device 102 when it is powered on for the first time. Since the electronic device 102 is configured to calibrate itself, this allows the external calibration equipment may be eliminated in at least some cases. Thus, performing a user assisted calibration routine upon power-up may be useful, for example, where external calibration equipment has not been used to calibrate the electronic device 102 during manufacture.

Following the user assisted calibration routine, at step 1004 the electronic device 102 may be configured to detect the occurrence of an event which may require the recalibration of the accelerometer 108. For example, the electronic device 102 may be configured to detect one or any combination of a powering off and on cycle of the electronic device 102, a battery change, or battery charge. After a powering off and on of the electronic device 102, the bias errors of the primary sensing components x, y, z of the accelerometer 108 may shift and the bias factors, B, may need to be recalculated to ensure optimum accuracy. The sensitivities, S, of the primary sensing components x, y, z may also shift following a powering off and on of the electronic device 102 and may also need to be recalculated to ensure optimum accuracy.

If a recalibration event is detected at step 1004, the electronic device 102 may execute a dynamic calibration routine at step 1006 in which the device is recalibrated without user assistance. For example, the device may execute the routines illustrated in FIG. 6 or 8 as dynamic calibration routine without requiring user assistance to orient the device in various predetermined orientations. In some embodiments, only the bias factors, B, will be recalculated at step 1006. As noted previously, the bias factors, B, have a tendency to shift to a greater extent than the sensitivities, S, after a power cycle. In other embodiments, both the bias factors, B, and the sensitivities, S, will be recalculated 1006.

During normal use of the accelerometer 108 by the device 102, the controller of the accelerometer 108 or electronic device 102 uses the calculated bias factors, B, and sensitivities, S, to determine an acceleration (typically in g) from the raw accelerometer measurements (typically in volts) of each primary sensing component x, y, z when the accelerometer 108 is in any orientation. Such accelerations may be determined using equation 18:

$$\text{Acceleration} = \frac{A - S}{B} \quad (18)$$

where A is the accelerometer measurement (in volts) on a particular primary sensing component x, y or z, S is the sensitivity of the particular primary sensing component, and B is the bias factor of the particular primary sensing component.

In some embodiments, the electronic device 102 includes a temperature sensor 202 and the controller 210 is configured to obtain the temperature from the temperature sensor 202 at the time at which accelerometer measurements are taken. The electronic device 102 is configured to correct the acceleration calculation in equation (18) for temperature variations in accordance with the temperature obtained from the temperature sensor 202 and a temperature sensitivity stored in the memory 214, or possibly the memory of the accelerometer 108. Adjusting the accelerometer measurements for temperature comprises normalizing the bias factor and sensitivity (scale factor) to yield bias factor and scale factors for the measured temperature. Temperature measurement and adjustment of accelerometer measurements may be used in any of the above described embodiments.

It will be appreciated that the calibration methods described herein may be user assisted, partially user assisted, or unassisted by the device user, depending on the embodiment. Accordingly, in some embodiments such as those depicted in FIGS. 6 and 8, the calibration routine is dynamic and does not require user input. The calibration routines described herein may be performed after the occurrence of a predetermined event, such as a power on of the electronic device 102, a power cycle of the device 102 (i.e., powering on and off of the device 102), an activation of the electronic device 102 when the device 102 is a mobile communication device such as a mobile phone, or a first power up of the electronic device 102.

While the present disclosure is directed primarily to an accelerometer having 3 pairs of opposed sensing components (oriented 180° apart, or being oriented parallel to each other but in opposed directions), accelerometers having one or two pairs of opposite sensing components, electronic devices incorporating such accelerometers, and methods of calibrating such accelerometers incorporated within the electronic devices are also within the scope of the present disclosure.

While the present disclosure is primarily described in terms of methods, a person of ordinary skill in the art will understand that the present disclosure is also directed to various apparatus such as a handheld electronic device including components for performing at least some of the aspects and features of the described methods, be it by way of hardware components, software or any combination of the two, or in any other manner. Moreover, an article of manufacture for use with the apparatus, such as a pre-recorded storage device or other similar computer readable medium including program instructions recorded thereon, or a computer data signal carrying computer readable program instructions may direct an apparatus to facilitate the practice of the described methods. It is understood that such apparatus, articles of manufacture, and computer data signals also come within the scope of the present disclosure.

The embodiments of the present disclosure described above are intended to be examples only. Those of skill in the art may effect alterations, modifications and variations to the particular embodiments without departing from the intended scope of the present disclosure. In particular, features from one or more of the above-described embodiments may be selected to create alternate embodiments comprised of a sub-combination of features which may not be explicitly described above. In addition, features from one or more of the above-described embodiments may be selected and combined to create alternate embodiments comprised of a combination of features which may not be explicitly described above. Features suitable for such combinations and sub-combinations would be readily apparent to persons skilled in the art upon review of the present disclosure as a whole. The subject matter described herein and in the recited claims intends to cover and embrace all suitable changes in technology.

The invention claimed is:

1. A method of calibrating an accelerometer of an electronic device, the accelerometer comprising a sensing element, wherein the sensing element includes a primary sensing component and a secondary sensing component which each measure acceleration along a first sensing axis, wherein the primary sensing component has a positive heading which measures positive acceleration in a first direction relative to the first sensing axis and the secondary sensing component has a positive heading which measures positive acceleration in a second direction oriented 180° relative to the first direction of the primary sensing component, the method comprising:

measuring first acceleration using the primary sensing component to obtain first calibration data;

measuring second acceleration using the secondary sensing component to obtain second acceleration calibration data;

determining calibration parameters in accordance with the first acceleration calibration data and the second acceleration calibration data, the calibration parameters representing values for adjusting an acceleration measured using the accelerometer; and storing the calibration parameters in a memory of the electronic device.

2. The method of claim 1, wherein the calibration parameters comprise a bias factor of the first sensing axis, the determining comprising:

determining the bias factor for the first sensing axis using the first acceleration calibration data and the second acceleration calibration data.

3. The method of claim 2, wherein the bias factor is determined as an average of the first acceleration calibration data and the second acceleration calibration data when the electronic device is in a first orientation.

4. The method of claim 2, wherein the bias factor is determined as an average of the first acceleration calibration data and the second acceleration calibration data when the electronic device is in a first and second orientation.

5. The method of claim 1, wherein the calibration parameters comprise a sensitivity of the first sensing axis, the method comprising aligning the first sensing axis with a force of gravity, and determining the sensitivity of the first sensing axis using the first acceleration calibration data and the second acceleration calibration data.

6. The method of claim 5, wherein the sensitivity is determined using the formula:

$$S = \frac{A' - A}{2}$$

where S is the sensitivity, A' is the first acceleration calibration data when the first sensing axis is aligned with the force of gravity, and A is the second acceleration calibration data when the first sensing axis is aligned with the force of gravity.

7. The method of claim 1, wherein the calibration parameters comprise a sensitivity of the first sensing axis, the method comprising determining the sensitivity of the first sensing axis using the first acceleration calibration data and the second acceleration calibration data using the formula:

$$S = \frac{A' - A}{2}$$

where S is the sensitivity, A' is the first acceleration calibration data when the first sensing axis is not aligned with the force of gravity, and A is the second acceleration calibration data when the first sensing axis is not aligned with the force of gravity; and transposing the sensitivity from a coordinate system in which the first sensing axis is not aligned with the force of gravity to a second coordinate system wherein the first sensing axis is aligned with the force of gravity.

8. The method of claim 1, further comprising measuring further acceleration to obtain measurement data using the accelerometer, and adjusting the measurement data in accordance with the calibration parameters stored in the memory.

9. The method of claim 8, further comprising:

measuring a temperature of the accelerometer;

determining a temperature correction factor for the accelerometer measurements in accordance with the measured temperature; and adjusting the measured acceleration in accordance with the calibration parameters stored in the memory and the temperature correction factor.

10. The method of claim 1, wherein the sensing element has three pairs of sensing axes, each of the three pairs of sensing axes being mutually orthogonal to each other, wherein the sensing element includes a primary sensing component and a secondary sensing component for each sensing axis which each measure acceleration along a respective sensing axis, wherein the primary sensing component for each sensing axis has a positive heading which measures positive acceleration in a first direction relative to the respective sensing axis and the secondary sensing component for each sensing axis has a positive heading which measures positive acceleration in a second direction oriented 180° relative to the first direction of the primary sensing component for respective sensing axis, the method comprising:

measuring first acceleration using the primary sensing component for each sensing axis to obtain first calibration data;

measuring second acceleration using the secondary sensing component for each sensing axis to obtain second acceleration calibration data;

determining calibration parameters for each sensing axis in accordance with the first acceleration calibration data and the second acceleration calibration data, the calibration parameters representing values for adjusting an acceleration measured using the accelerometer; and storing the calibration parameters in the memory of the electronic device.

11. An accelerometer, comprising a sensing element, wherein the sensing element includes a primary sensing component and a secondary sensing component which each measure acceleration along a first sensing axis, wherein the primary sensing component has a positive heading which measures positive acceleration in a first direction relative to the first sensing axis and the secondary sensing component has a positive heading which measures positive acceleration in a second direction oriented 180° relative to the first direction of the primary sensing component.

12. The accelerometer of claim 11, wherein the sensing element has three pairs of sensing axes, each of the three pairs of sensing axes being mutually orthogonal to each other, wherein the sensing element includes a primary sensing component and a secondary sensing component for each sensing axis which each measure acceleration along a respective sensing axis, wherein the primary sensing component for each sensing axis has a positive heading which measures positive acceleration in a first direction relative to the respective sensing axis and the secondary sensing component for each sensing axis has a positive heading which measures positive acceleration in a second direction oriented 180° relative to the first direction of the primary sensing component for respective sensing axis.

13. The accelerometer of claim 12, wherein the three pairs of sensing axes are formed from a common sensing element.

14. An electronic device, comprising:
an accelerometer comprising a sensing element, wherein the sensing element includes a primary sensing component and a secondary sensing component which each measure acceleration along a first sensing axis, wherein the primary sensing component has a positive heading which measures positive acceleration in a first direction relative to the first sensing axis and the secondary sensing component has a positive heading which measures positive acceleration in a second direction oriented 180° relative to the first direction of the primary sensing component;
a controller connected to the accelerometer;
a memory connected to the controller for storing calibration data for the accelerometer;
the controller, in a calibration mode, being configured to determine calibration parameters in accordance with acceleration calibration data from the accelerometer and store the calibration parameters in the memory;
the controller, in a measuring mode, being configured to measure acceleration using the accelerometer and to adjust the measured acceleration in accordance with the calibration parameters stored in the memory.

15. The electronic device of claim 14, wherein the controller, in the calibration mode, is configured to measure first acceleration using the primary sensing component to obtain first calibration data, measure second acceleration using the secondary sensing component to obtain second acceleration calibration data, determine calibration parameters in accordance with the first acceleration calibration data and the second acceleration calibration data, the calibration parameters representing values for adjusting an acceleration measured using the accelerometer, and store the calibration parameters in a memory of the electronic device.

16. The electronic device of claim 14, wherein the sensing element has three pairs of sensing axes, each of the three pairs of sensing axes being mutually orthogonal to each other, wherein the sensing element includes a primary sensing component and a secondary sensing component for each sensing axis which each measure acceleration along a respective sensing axis, wherein the primary sensing component for each sensing axis has a positive heading which measures positive acceleration in a first direction relative to the respective sensing axis and the secondary sensing component for each sensing axis has a positive heading which measures positive acceleration in a second direction oriented 180° relative to the first direction of the primary sensing component for respective sensing axis.

17. The electronic device of claim 14, further comprising a low pass filter for filtering accelerometer measurements to remove a dynamic component caused by movement of the accelerometer.

18. The electronic device of claim 14, further comprising a low drop out regulator providing power to the accelerometer.

19. The electronic device of claim 14, wherein the accelerometer is a ratiometric accelerometer.

20. The electronic device of claim 14, further comprising a temperature sensor for measuring a temperature of the accelerometer, wherein the memory contains a mapping of temperature to temperature correction factors, the controller in the measured mode being configured to determine a temperature correction factor for the accelerometer measurements in accordance with the measured temperature, and adjust the measured acceleration in accordance with the temperature correction factor.

* * * * *